United States Patent [19]

Little et al.

[11] Patent Number: 4,854,503

[45] Date of Patent: Aug. 8, 1989

[54] BOOM SPRAYING APPARATUS

[76] Inventors: Henry M. T. Little, 2 Taylor Street, Esperence; John W. Hagon, Suite 509, Eastpoint Tower, 235-287 New South Head Rd., Edgecliff 2027, New South Wales, both of Australia

[21] Appl. No.: 202,414

[22] Filed: Jun. 6, 1988

[51] Int. Cl.⁴ ............................................... B05B 1/20
[52] U.S. Cl. .................................... 239/167; 239/166
[58] Field of Search ....................... 239/159, 165–168, 239/176

[56] References Cited

U.S. PATENT DOCUMENTS

| | | | |
|---|---|---|---|
| 2,690,355 | 9/1954 | Waters et al. | 239/168 |
| 3,223,330 | 12/1965 | LaPlante | 239/168 |
| 4,106,700 | 8/1978 | Clark | 239/168 |
| 4,561,591 | 12/1985 | Ballu | 239/159 |

FOREIGN PATENT DOCUMENTS

| | | | |
|---|---|---|---|
| 1298775 | 7/1969 | Fed. Rep. of Germany | 239/159 |
| 1121603 | 7/1968 | United Kingdom | 239/167 |

Primary Examiner—Andres Kashnikow
Assistant Examiner—Patrick N. Burkhart
Attorney, Agent, or Firm—George H. Dunsmuir

[57] ABSTRACT

A vehicle having a boom assembly for applying herbicides, pesticides, or fertilizers in fluid form, i.e. as liquid, powders or granules, over tracts of land, has opposite end-portions of the boom projecting away from respective opposite sides of the vehicle. Each end-portion is connected by a universal joint to a central frame which is fixed to the vehicle, and its weight is supported by guys which are tensioned by a spring and interconnect the two boom end-portions. A spring leaf skid is provided under each boom end-portion and bears on the ground only if the vehicle rocks. The guying is so arranged that rocking of the vehicle in one direction causes the slack from the boom end-portion whose skid bears on the ground to be fed to the other boom end-portion so that the spacing from the ground of the two boom end-portions remains acceptably constant despite rocking of the vehicle.

11 Claims, 4 Drawing Sheets

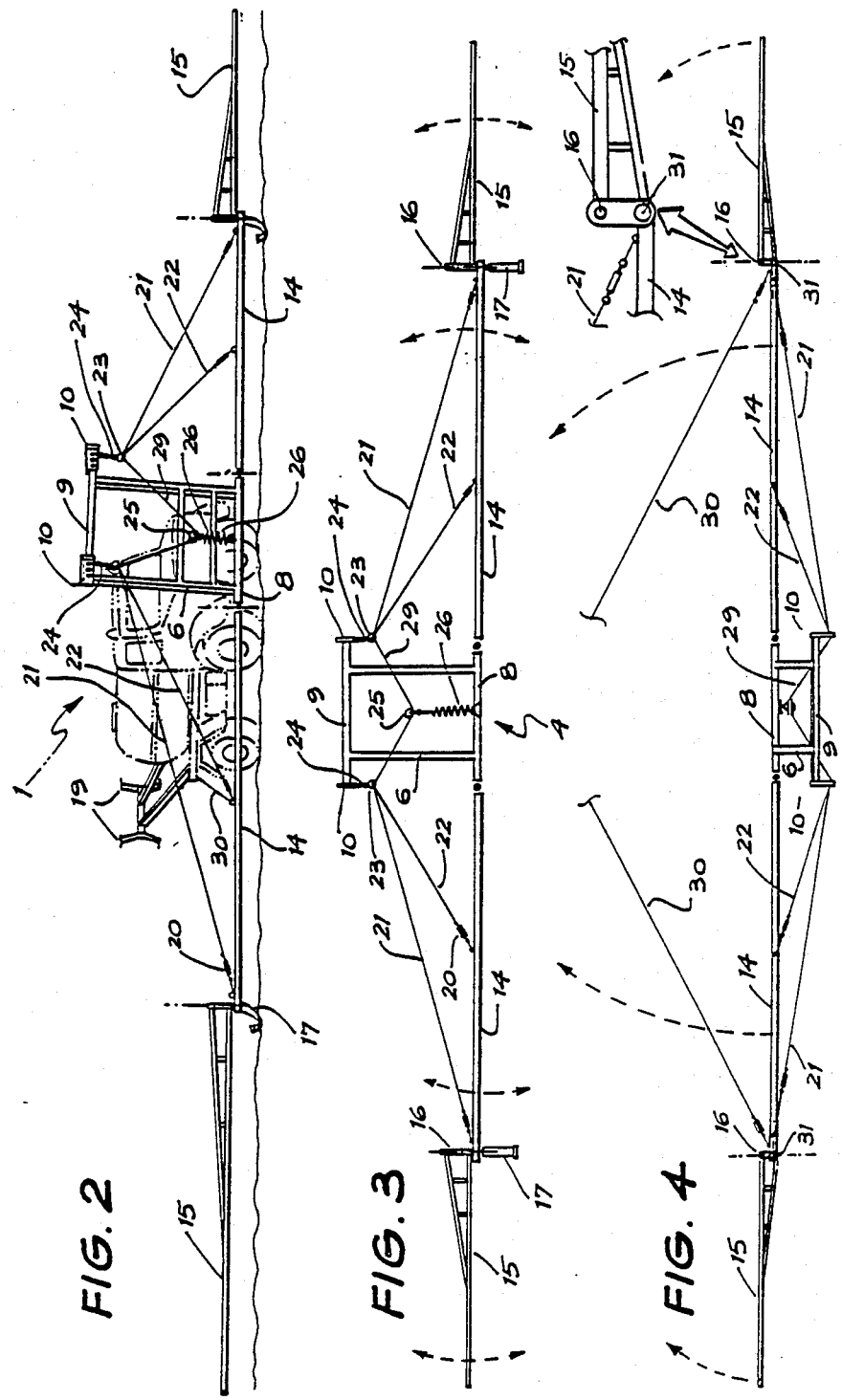

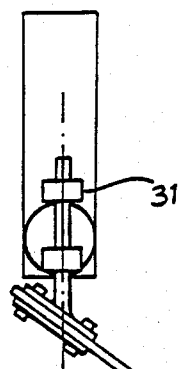
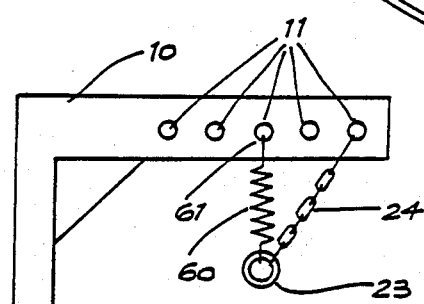
FIG. 5
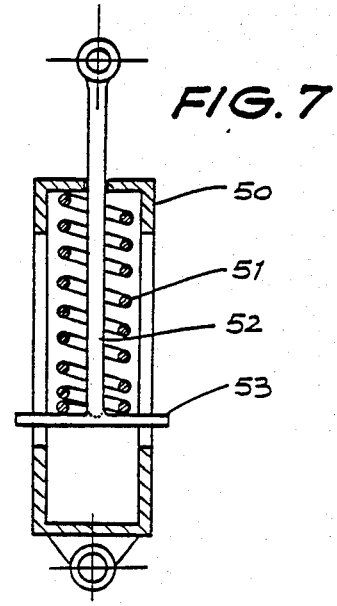
FIG. 6
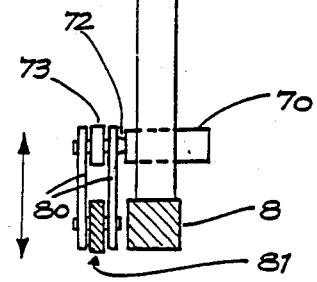
FIG. 7

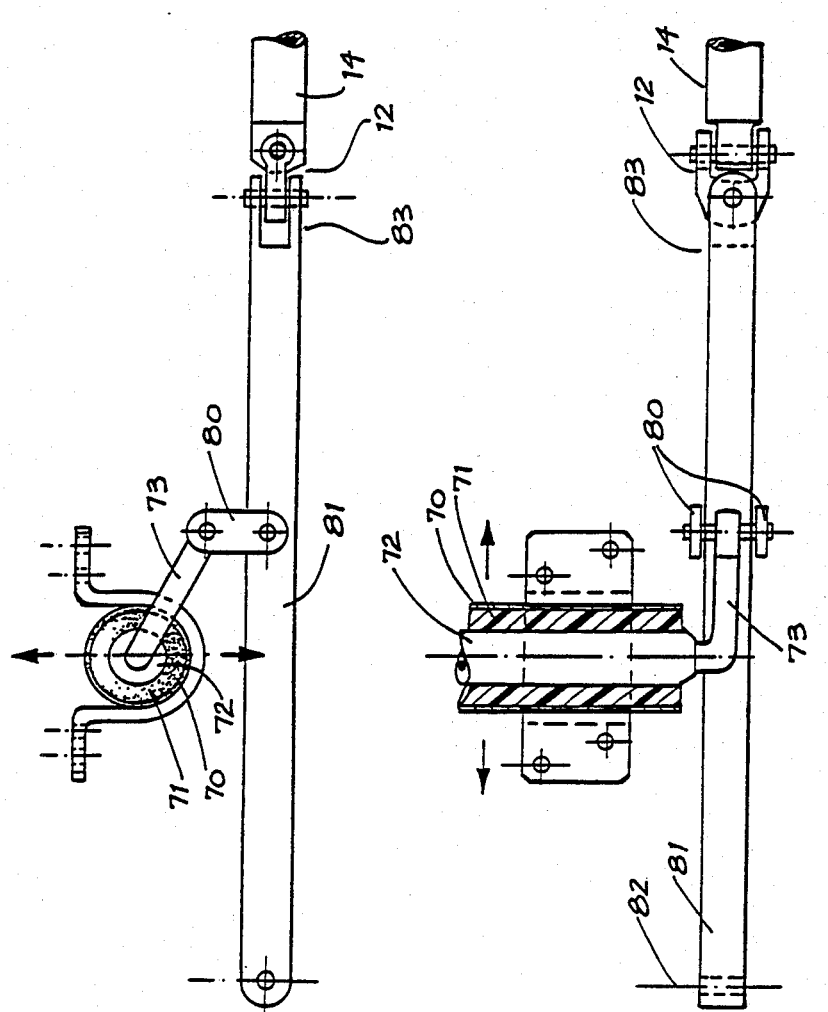

BOOM SPRAYING APPARATUS

BACKGROUND OF THE INVENTION

There is a demand for apparatus capable of spraying chemicals in fluid form evenly and quickly over tracts of farmland and pasture land. The fluids may be used to control pests on or in the earth or on foliage into which crops are to be or have been sown, or to control the growth of plants such as standing crops or weeds.

Such fluids should be applied evenly and at an ascertained concentration if they are to be effective. This is particularly important with selective herbicides where too strong a concentration can adversely affect the crop or soil or required plant species. This imposes demands on the apparatus used to apply the chemicals.

A further problem is that the atmospheric conditions prevailing during spraying have to be taken into account. Ideally, the fluids are applied to the plants or ground in relatively low wind conditions. In practice, such conditions often occur at night and therefore such spraying can be carried out between dusk and dawn.

Ground spraying with liquid chemicals occurs at certain times of the year and is invariably entrusted to a contract sprayer who owns the appropriate equipment. At these times the services of a contract sprayer can be much in demand. Should he contract to spray on a day which is unsuitable, it may be some time before he again has adequate time available to undertake the spraying. For this reason it is desirable that when the conditions are right, spraying should be carried out as quickly as possible and in a way which is effective and does not risk damage to the crops or the soil in which they are sown.

Conventionally, liquid chemicals are applied to large tracts of land by a boom-spraying vehicle which may be power driven or in the form of a trailer. The vehicle has a tank containing the liquid which is pumped into a horizontally extending boom projecting away from one or both sides of the vehicle. The boom is provided with spaced apertures and/or metering devices directing sprays of liquid downwardly so that as the vehicle advances, the area directly beneath the boom is wetted with liquid at an even and constant rate. For convenience, the area directly beneath the boom which may be earth, vegetation or crops will hereafter be referred to as the "target area".

A number of factors in practice limit the speed at which liquid chemicals can be applied to land even when the atmospheric conditions are suitable for optimum results. Ideally the liquid should be applied at a preferred volume and pressure per unit target area and the vehicle should travel at a speed which enables this to be done as quickly as possible without loss of uniformity or accuracy in the application.

A pneumatically-tired vehicle can move faster over land than a tracked vehicle and, at least theoretically, can spray a larger area of land in a given time. However a pneumatically-tired vehicle is more susceptible to rocking when passing over rough or uneven ground than a tracked vehicle. Such rocking limits the length of boom that can Project from the side of the vehicle to about 20 feet. If the boom is longer, its end may dig into the ground when the vehicle rocks and be broken. Although a longer boom could be placed at a higher level on the vehicle, this greatly reduces the accuracy of application and reduces the penetration of the liquid onto the target area. In practice the maximum span of boom assembly is usually considered as being about 46 feet. The assembly has approximately a 6-foot long centre section extending across the width of the vehicle and two boom end-portions which project 20 feet from either side. Jointing is provided to enable the boom end-portions to be stowed, folded or removed when not in use.

A 46-foot boom mounted on a pneumatically-tired vehicle, is normally arranged at about 2 feet above ground level. However, uniform application and optimum spray penetration onto the target area is obtained when the boom is only 12–18 inches above the target area. Thus effectiveness of the spraying is sacrificed for speed. Other problems experienced with a 20-foot boom end-portion are that it tends to whip with vertical jolting movement of the vehicle thus reducing accuracy of application, and it may sag at its end and suffer fatigue cracking as a result of its weight.

The speed at which a pneumatically-tired boom spraying vehicle can operate satisfactorily is normally considered to be about 8–12 kilometers per hour. Bearing in mind that the width of the boom assembly is some 46 feet, such a vehicle can theoretically only spray up to about 170 hectares of land in 10 hours, if the land is even. If the land is rough or its topography is irregular, the speed of spraying has to be reduced and the time necessary to spray is correspondingly increased.

An object of the invention is to provide an improved boom spraying apparatus capable of operating at a higher degree of efficiency at a substantially higher speed than hitherto.

OBJECTS OF THE INVENTION

A second object of the invention is to provide a boom spraying vehicle with a substantially larger width of boom assembly than hitherto.

A further object of the invention is to provide a boom spraying vehicle having a boom assembly capable of being easily and quickly moved from an extended position in which it is used, to a stowed position at which the vehicle can comply with normal road user requirements.

BRIEF SUMMARY OF THE INVENTION

In accordance with the invention, a boom-spraying vehicle has opposite end-portions of its boom assembly each connected by a universal joint to a respective side of the vehicle. Each end-portion is provided with a ground follower towards its outer end and is supported by guying from guy support points arranged on the lower ends of elements capable of swinging transversely to the direction of movement of the vehicle. An inextensible spring-loaded tie extends between the guy support points to equalise their tensions. The form of interconnection of the guying is such that the transfer of rocking movement of the vehicle to the boom end-portions is minimized by the swinging movement of the elements.

The transverse swinging movement of the elements causes a small change in their respective heights and this may be sufficient to cause the ground follower of one boom end-portion to bear on the ground. Its weight is then momentarily transferred from the guying to the ground follower. The associated guying therefore slackens and the slack is transferred by the flexible tie to the other boom end-portion which is lowered in consequence. As a result, the rocking of the vehicle does not produce a corresponding vertical rocking of the two boom end-portions and the spacing of each with respect to the ground, as well as its parallel relationship therewith, is maintained.

Because the boom end-portions are influenced to only a negligible extent by rocking of the vehicle, a longer boom length than hitherto can be used and the vehicle can also be driven faster without risk of damage to the booms. Moreover, the booms can be mounted lower and at the optimum height for spraying.

Preferably the guying support points on the vehicle are provided by a junction ring, conveniently provided by a shackle supported by a frame carried by the vehicle. The junction rings are arranged at a level above and preferably forwardly of the corresponding universal joints. The weight of the boom end-portions then biases them naturally towards their extended positions at which they project at approximately right angles to opposite sides of the vehicle and in coaxial alignment. The forward movement of each boom end-portion is suitably limited by a tie rope connecting it to the rear of the vehicle.

Conveniently the junction rings are mounted on pendant chains from the frame, providing the swinging elements. This allows the frame to rock with the vehicle without producing a corresponding rocking movement of the junction rings as the chains simply swing to accommodate the rocking motion.

Vertical jolting movements of the vehicle are transmitted by the chains to the boom end-portions by way of the guys although some of the shock will be absorbed by the resilience of a prestressed tensioning spring which maintains the tension in the guying equal to the weight of the boom end-portions and which acts by way of a pulley running on a tie cable extending between the junction rings. The transmission of vertical jolting movement of the vehicle to the boom assembly can be further reduced by suspending the junction rings from vertical shock absorbers or by hanging a coiled spring on the frame so that it holds an associated pendant chain at an inclined position.

Conveniently the universal joint is connected between the boom end-portion and one end of a support arm hinged at its other end to the vehicle so as to be able to move vertically about the axis of the hinge against a resilient bias. This bias is preferably provided by a torsion suspension unit having a radial arm connected by a link to an intermediate position on the support arm. Sudden vertical movements of the vehicle are then damped out by the torsion unit so that the adjacent end of the associated boom end-portion does not have vertical jolting movement of the vehicle transmitted to it.

Preferably the tensioning spring which prestresses the tie cable is adjustable so that the tension of the guying may be changed to suit the operating conditions of the boom.

It should be recognized that the purpose of the ground follower, preferably a spring leaf skid, is not to carry the weight of the associated boom end-portion under normal operating conditions. It is in practice held above, or only just in contact with the ground. The entire weight of the boom end-portion is carried by the guying. The ground follower takes the weight of the boom end-portion only when the vehicle rocks in that direction or a slope in the ground is encountered. The guying then lowers the other boom end-portion to maintain its ground clearance and simultaneously absorbs the load on the ground follower. The ground follower is conveniently pivoted for rotation horizontally through 360 degrees.

The ground follower is conveniently located close to a hinge point joining two sections of the boom end-portion. The two sections are in alignment with one another when the boom end-portion is in its operating position. However if an obstruction is encountered by the outboard section, it folds back about the hinge and, on passing the obstruction, returns to its operating position automatically by a forward bias induced by the geometry of the hinge design.

Although the apparatus may form a permanent attachment to a vehicle, it can also be mounted on a trailer or comprise simply a frame attached to the boom end-portions and provided with guying so that, when required for use, it can be mounted on a suitable vehicle to operate as described herein.

Preferably the operating height of the boom is adjustable by mounting it on a frame which is vertically movable on the vehicle, and by making appropriate adjustments to the height of the ground followers.

BRIEF DESCRIPTION OF THE DRAWINGS

The invention will now be described in more detail, by way of example, with reference to the accompanying largely diagrammatic drawings.

FIG. 2 shows the vehicle with the boom assembly extended to its operating position at which its weight is carried by guys from a support frame mounted on the front of the vehicle;

FIG. 3 shows schematically the support frame with the guying and the extended boom assembly as it would be seen from the front of the vehicle;

FIG. 4 is a plan view of FIG. 3;

FIG. 5 shows, in side-elevation, a ground follower provided by a spring leaf skid attached at its upper end to a corresponding boom end-portion;

FIG. 6 shows a modification of the way the guying is supported by the frame in FIG. 3;

FIG. 7 shows in vertical section a shock absorber for connecting the guying to the frame in a second modification of FIG. 3; and, FIG. 8 shows a torsion suspension unit for mounting the inner end of each boom end-portion in accordance with a further modification.

DESCRIPTION OF THE PREPARED EMBODIMENT(S)

Figure 1:
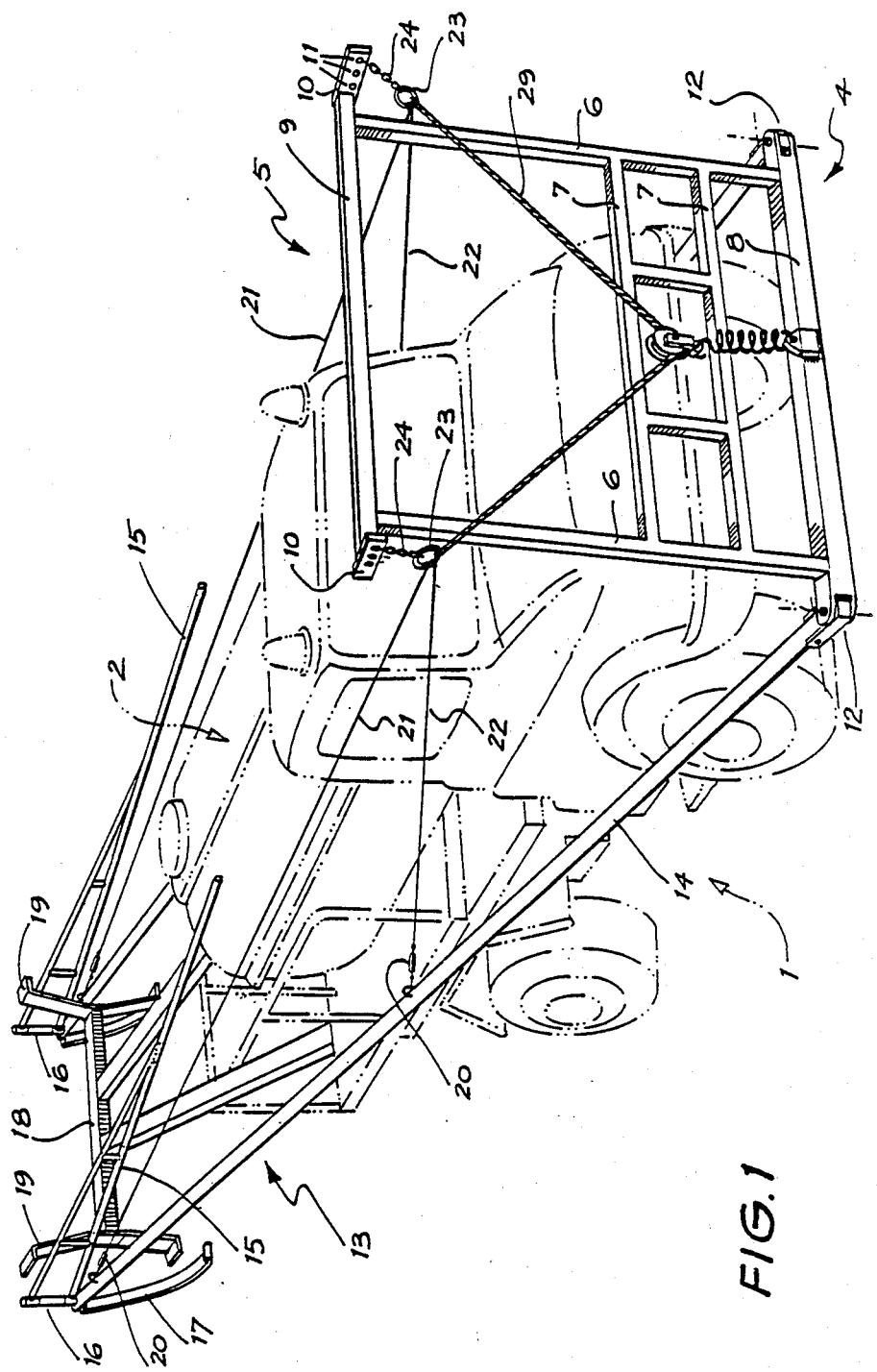
FIG. 1 is a front perspective view of a boom spraying vehicle showing a boom assembly in its stowed position.

FIG. 1 shows a pneumatically-tired agricultural vehicle 1 having a tank 2 for chemical liquid. It is equipped with a pump (not shown) for transferring liquid from the tank to a boom assembly 4 shown in its stowed position.

The front of the truck carries a generally rectangular frame 5 formed with forwardly inclined uprights 6 connected by horizontal braces 7. A support-bar 8 extends between the lower ends of the uprights 6 and a cross-bar 9 extends between and beyond their upper ends. Two cross-heads 10 are provided at respective ends of the cross-bar 9 and each is formed with a set of spaced anchorage holes 11.

The support-bar 8 carries at each end a universal joint 12 which connects it to one end-portion of the boom assembly 4. Such end-portion comprises a tubular steel boom 13 having an intermediate section 14 which slopes diagonally upwards towards the rear of the vehicle, and an end section 15 which is hinged to the upper end of the section 14 and is folded back along the vehicle as illustrated. The hinge point between the two sections 14, 15 is referenced 16 and a spring leaf skid or ground follower 17 is supported close to this point.

The rear of the vehicle carries a second or stowage frame 18 formed with side-guards 19 which locate the rear-most portions of the boom sections 14 and 15 in their stowed positions. Clamps and locking devices (not shown) hold the boom assembly 4 firmly in the position shown in FIG. 1 when the vehicle is on the road.

FIG. 2 shows the vehicle 1 with the boom assembly extended. As is apparent, the boom end-portions project a substantial distance away from the respective sides of the vehicle at the desired height of approximately 14 inches above ground level. This is referred to hereafter as the "target height". The tip-to-tip span of the boom assembly in the position shown in FIG. 2 is 105 feet.

Each boom end-portion when extended has its sections 14 and 15 held in alignment with one another by a removable hinge pin inclined to maintain the alignment. A flexible hose (not shown) feeding a line of metering nozzles extends the entire length of the boom assembly and is attached at intervals along its length to the sections 14, 15 and to the bar 8. Pipe connections, also not shown, extend between the hose and the pump and between the pump and the tank. Filtering and metering controls, also not shown, are provided on the vehicle.

As shown in FIG. 3 the weight of the boom end-portions is carried by guying. Each end-portion is supported by two guys 21, 22. The lower end-portions of the guys are connected, respectively, adjacent to the hinge point 16 and to the intermediate boom section 14 approximately midway along its length.

Each of the guys 21, 22 extends upwardly towards its own support point provided by a ring 23 which is at the lower end of a swinging element provided by a chain 24. The chain hangs from one of the anchorage holes 11 provided at the forward end-portion of one of the cross-heads 10 provided on the upper part of the frame 4. The support rings 23 are interconnected by an inextensible tie cable 29 which passes through a pulley 25 and is tensioned transversely by a spring 26 connected between the pulley and the frame of the vehicle. A tension adjusting device (not shown) which may be a block and tackle device is provided between the pulley 25 and the spring 26 to enable the tension in the tie cable 29 and thus in the guys 21, 22 to be adjusted. When the boom is extended and the tension is correctly set, the tie cable 29 is pulled into a wide V by the tension of the spring 26 and the chains 24 hang substantially vertically. The ground follower spring leaf skids 17 then have their lower ends held just above ground level.

Bottle-screw adjusters 20 at the outer ends of the guys 21, 22 enable their effective lengths to be individually adjusted so that the boom end-portions are supported horizontally.

FIG. 4 shows a tie rope 30 extending rearwardly from the hinge point 16 of each boom end-portion to a rear anchorage on the vehicle. The rope 30 is made of a material resiliently stretchable and limits the extent to which the boom end-portion swings downwardly and forwardly about the universal joint 12.

FIG. 5 shows a spring leaf skid 17 in detail. It is carried at the lower end of a vertical rotatable pin 31 so that it can turn through 360 degrees in a horizontal direction.

The vehicle 1 is driven to the site of use with the boom assembly in the stowed position shown in FIG. 1. The clamps and locking devices are released and the boom end-portions, comprising the folded sections 14 and 15, are swung outwardly. Because rings 23 are located forwardly of the vertical plane through the universal joints 12, the outward movement of the boom section 14 is accompanied by a downward and forward movement under its own weight until the tie rope 30 prevents further forward movement. The boom section 14 is then parallel to the ground and in alignment with the support-bar 8.

The end section 15 is then folded outwardly about its hinge and held in its extended position by a suitable restraining device (not shown). The end section 15 is not essential and may be detached from the boom section 14 if not required.

When both boom end-portions have been extended to the positions shown in FIG. 2, it may be necessary to adjust the bottle screws 20 and the tension adjusting device associated with the spring 26 to ensure that the weight of the boom end-portions is carried by the guys 21 and 22, and they extend horizontally with the skid 17 just above or just touching the ground.

The vehicle is now ready for use. Being pneumatically-tired, it can be driven rapidly over the ground but inevitably will tend to rock. However the guying arrangement operates to prevent such movement being applied to the boom end-portions so that they maintain their ground clearance and their parallel relationship to the ground substantially constant. How this result is achieved will be better understood with reference to FIG. 3.

It will be appreciated from FIG. 3 that the frame 4 rocks with the vehicle. Let it be assumed that the frame tilts a few degrees counter-clockwise. This causes the skid 17 of the left boom end-portion to bear on the ground thereby maintaining the ground clearance for the boom end-portion sensibly constant. Some of the weight of the end-portion is transferred to the skid 17. This causes the load supported by the associated guys 21, 22 to diminish and a corresponding reduction in tension of the left hand guys occurs. As the tension on the right hand guys continues, the chains 24 tend to be pulled at the junction rings 23 from the vertical position to the right. Thus much of the rocking movement of the frame 4 is not transmitted to the junction rings 23. Simultaneously, the tie cable 29 travels through the pulley 25 to the right until the tension of the guys of the left boom end-portion balances that of the right boom end-portion and is sufficient to support them both. This tension is determined by the setting of the spring 26. The load on the skid 17 formerly touching the ground then disappears. The tilting to the left of the frame 4 would normally be accompanied by a lifting of the right boom end-portion. However, this movement does not occur as a result of the movement of the tie cable 29 to the right and the swinging movement of the chains 24 which allows the frame to move to the left without a corresponding movement of the junction rings 23. Thus, despite the rocking of the vehicle, the boom end-portions remain substantially horizontal and parallel to the ground.

When the vehicle re-assumes its upright position the skid 17 of the right boom end-portion momentarily touches the ground and some of the associated boom end-portion's weight is transferred to it. This causes the guying system to readjust so that the equilibrium position shown in FIG. 3 is re-assumed.

The vehicle shown in FIG. 2 can be driven rapidly over smooth ground and if the terrain is uneven, the skids 17 operate to adjust the booms to the slope of the terrain automatically.

Occasionally an obstruction may be encountered in the path of the boom assembly, particularly if night spraying is being carried out and the obstruction cannot be seen. Should one of the boom end-portions strike such an obstruction, it swings rearwardly against the bias of its own weight. This rearward movement is accompanied by a progressive lifting of the outer end of the boom end-portion as a result of the anchorage point 11 in the cross-head 10 being located in front of the universal joint 12. The obstruction therefore tends to be cleared automatically. The boom end-portion then swings back under its own weight to the position determined by the length of the tie cable 30.

At the end of a pass over the ground the vehicle can be turned easily without fear of damaging the booms as the boom end-portion on the inside of the turn may, depending on the extent of the turn, simply swing backwards on its skid 17 while the other boom end-portion turns around with the turning vehicle. The pin 31, being rotatable through 360 degrees, allows the boom end-portions to move easily in any direction.

The only movement of the vehicle not compensated for by the arrangement shown in FIG. 3 is vertical jolting movement. FIGS. 6 and 7 show arrangements which reduce the extent to which vertical movements of the frame 4 are transmitted to the support rings 23.

In FIG. 6, the support ring 23 is partially supported by a pendant coil spring 60 pivoted at its upper end 61 to the cross-head 10, as well as by the chain 24 which is held by the spring 60. The chain 24 is held by the spring 60 at an angle of approximately 60 degrees to the horizontal when the vehicle is stationary and level.

If the frame is jolted vertically, the chain 24 allows the coil-spring 60 to extend and to tilt so that the chain 24 moves closer to a vertical position. The combined action of the spring 60 and chain 24 provides a shock absorber which reduces the extent to which vertical jolting movements of the frame 4 are applied to the support ring 23.

In the second modification shown in FIG. 7 the chain 24 is replaced by a shock-absorber unit. This comprises a cylinder 50 provided with diametric longitudinal slots. The cylinder 50 contains a coil compression spring 51 which encircles a rod 52 having a cross-piece 53 at its end. Opposite end-portions of the cross-piece 53 are accommodated in the slots so they can ride along it. The support ring 23 is attached to a connecting eye at the lower end of the unit which is attached at its upper end by a shackle (not shown) to the cross-head 10.

The shock absorber unit can swing from side to side for the same purpose as the chain 24 in FIG. 3. However, if the vehicle jolts vertically upwards, this movement is imparted to the cross-piece 53 and compresses the spring 51 within the cylinder 50. The spring 51 acts to dampen the transmission of the vertical jolting movement of the cylinder 50 supporting the support ring 23.

The modification shown in FIG. 8 is used to dampen the transmission of vertical movements, induced by rocking movement of the vehicle, to the universal joint. A torsion suspension cylinder 70, shown in longitudinal section and also in end-elevation, contains a torsion rubber tube 71 connected to the inside wall of the cylinder and to the outside wall of a shaft 72. A radial arm 73 projects from one end of the shaft 72 and carries at its end a link 80 which, at its lower end is pivoted to an intermediate point on an arm 81. The inner end of the arm 81 is pivoted to the vehicle to turn about a horizontal axis extending in the direction of travel of the vehicle. The outer end of the arm 81 carries the universal joint 12 to which the boom section 14 is attached.

The torsion unit of FIG. 8 is conveniently of the type sold under the trade mark FLEXITOR by the Mobiltrail Manufacturing Company Pty. Limited of Moorabbin, in the State of Victoria.

The shaft 72 carries at one end a radial arm 73 connected by a link 80 to an intermediate position on a support arm 81 so as to exert a bias restoring the arm 81 to the position shown. The arm 81 has one end hinged to the vehicle about a horizontal axis 82 which lies in the central longitudinal vertical plane of the vehicle. The arm 81 has its other end 83 connected by the universal joint 12 to one boom end-portion 14.

The position of the boom end-portion 14 is determined by the lengths of the guys 21 and 22 which carry its weight. If the vehicle rocks the arm 73 of the torsion unit turns about its axis and only a negligible amount of the rocking movement of the vehicle is transmitted to the point of connection of the link 80 with the support arm 81. As the vertical movement of the vehicle at its centre line is minimal during rocking, the vertical position of the support arm 81 is not affected by its hinged end and thus the vertical position of the universal joint 12 remains sensibly constant when the vehicle rocks.

An example of a vehicle as described with reference to FIGS. 1 to 5 above has the following performance characteristics.

The capacity of the liquid tank is 1,000 gallons which is pumped through the hose of the boom assembly at a steady rate to give a coverage of 45 liters per hectare. During application of the liquid the vehicle travels with a forward speed of 25 kilometers per hour achieving a cover of 590 hectares in a 10-hour day (including refuelling time). It is capable of operating under wind conditions of up to 55 kilometers per hour and, because it uses floatation tires rather than tracks, it can pass over young seedlings with minimal disturbance to them.

Although the invention has been described with reference to a pneumatically-tired vehicle, it will be apparent that it is also applicable to a tracked vehicle and will still give advantages over conventional boom spraying equipment. It can also be used, with suitable modification, to apply granular materials in fluid form to the target area. The term "fluid" as used in this specification is to be understood as covering solid materials which are capable of flowing, as well as liquids.

What is claimed is:

1. Apparatus comprising a vehicle having opposite sides, a fluid holder such as a tank on said vehicle, a boom assembly on said vehicle, opposite end-portions of said boom assembly extending horizontally away from opposite sides of said vehicle, means extending longitudinally of said boom assembly and for discharging fluid from said holder downwardly onto the ground or target area, beneath said boom assembly, pipe connections extending from said holder to said boom assembly, and support means holding said boom end-portions in parallel space relationship with the ground, wherein the improvement comprises forming the support means with:

(a) a universal joint between the vehicle and each end-portion of the boom assembly;

(b) swinging means pendantly supporting guy support points at a level above the boom assembly and which are swingable transversely of the direction of movement of the vehicle;

(c) a guying system providing load-supporting guys extending upwardly from said end-portions of the boom assembly to the support points;

(d) means interconnecting the support points to equalise the guy tensions; and (e) ground followers on respective boom end-portions and to which their weight can be temporarily transferred when the vehicle rocks or the terrain alters.

2. The apparatus claimed in claim 1, in which the swinging means comprise two elements providing respective guy support points at their lower ends, and a spring-loaded tie cable interconnecting the support points and extending through a runner, such as a pulley or a ring, which is resiliently biased in a direction transverse to the cable.

3. The apparatus claimed in claim 2, in which the guy tensioning device comprises an adjustable tension spring connected at one end to the vehicle and at the other end to the pulley by way of an adjustable spring tensioning device.

4. The apparatus claimed in claim 3, in which the swinging elements are located above and forwardly of the universal joints.

5. The apparatus claimed in claim 4, in which a stowage frame on the vehicle accommodates the boom end-portions lying respectively against the sides of the vehicle and sloping upwardly and rearwardly from the universal joints which are provided at the forward end of the vehicle.

6. The apparatus claimed in claim 5, in which tie ropes extend from the rear of the vehicle to the end-portions of the boom assembly and restrain their forward and downward movements about the universal joints to positions at which they extend substantially at right angles to the sides of the vehicle.

7. The apparatus claimed in claim 6, in which the boom assembly and its support means are attached to a main support frame on the vehicle and means are provided to adjust the vertical position of the main support frame to vary the ground clearance of the boom end-portions.

8. The apparatus claimed in claim 7, in which the swinging elements have springs to dampen the transmission of vertical jolting movements of the vehicle to the boom end-portions.

9. The apparatus claimed in claim 8, in which biassing means are connected between the vehicle and each universal joint and dampen the transmission of vertical movements, produced by rocking of the vehicle, to the universal joint.

10. The apparatus claimed in claim 9, in which the biassing means includes a support arm connected to turn vertically about a horizontal hinge access lying substantially in the longitudinal, vertical, medial plane of the vehicle, and a torsion suspension unit connected between the vehicle and an intermediate position on the support arm to dampen the transmission of vertical movements of the vehicle, when it rocks, to the support arm which is connected at its free end to the universal joint.

11. The apparatus claimed in claim 10, in which the ground follower comprises a spring leaf skid turnable through 360 degrees about a pivot pin, and located towards the outer extremity of the boom.

* * * * *